United States Patent [19]

Gloriod et al.

[11] Patent Number: 4,644,044

[45] Date of Patent: Feb. 17, 1987

[54] PROCESS FOR MANUFACTURING ETHYLENE TERPOLYMERS AND ETHYLENE COPOLYMERS

[75] Inventors: Pierre Gloriod, Lillebonne; Joel Andureau, Noeux les Mines; Maurice Pellegrini, Lievin, all of France

[73] Assignee: Societe Chimique des Charbonnages, S.A., France

[21] Appl. No.: 768,444

[22] Filed: Aug. 22, 1985

[30] Foreign Application Priority Data

Aug. 23, 1984 [FR] France .................................. 84 13138

[51] Int. Cl.$^4$ ............................................. C08F 20/08
[52] U.S. Cl. ................................................... 526/272
[58] Field of Search .......................................... 526/272

[56] References Cited

U.S. PATENT DOCUMENTS 3,884,857 5/1975 Ballard .................................. 526/272
3,925,326 12/1975 Logothetis .......................... 526/272
3,926,925 12/1975 Kuntz ................................... 526/272

FOREIGN PATENT DOCUMENTS 2091745 8/1982 United Kingdom .

*Primary Examiner*—Paul R. Michl

*Attorney, Agent, or Firm*—Finnegan, Henderson, Farabow, Garrett & Dunner

[57] ABSTRACT

A process for the manufacture of radical ethylene terpolymers or copolymers comprising moieties derived from an alkyl (meth)acrylate and/or moieties derived from maleic anhydride by copolymerizing, in the presence of at least one free-radical initiator, a mixture of ethylene, (meth)acrylate and/or maleic anhydride in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein the feeding of the (meth)acrylate and/or maleic anhydride into the reactor if effected by introducing maleic anhydride and/or (meth)acrylate at the intake of the secondary compressor. In the case of terpolymers, maleic anhyride is introduced as a solution in the (meth)acrylate.

The process of the invention has the advantage of not requiring a homogenization device before the entry of the monomers into the reactor.

4 Claims, No Drawings

PROCESS FOR MANUFACTURING ETHYLENE TERPOLYMERS AND ETHYLENE COPOLYMERS

FIELD OF THE INVENTION

The present invention relates to a new process for manufacturing ethylene terpolymers and ethylene copolymers.

More precisely, the invention relates to a new process for manufacturing radical ethylene terpolymers comprising moieties derived from a (meth)acrylate and moieties derived from maleic anhydride, and radical ethylene copolymers comprising moieties derived from a (meth)acrylate and radical ethylene copolymers comprising moieties derived from maleic anhydride.

BACKGROUND OF THE INVENTION

British Pat. No. 2,091,745 describes a process for the manufacture of ethylene terpolymers comprising moieties derived from a (meth)acrylic ester and moieties derived from maleic anhydride, by copolymerization under high pressure, in the presence of at least one free-radical initiator, of a mixture of ethylene, (meth)acrylic ester and maleic anhydride. In this process, the introduction of the (meth)acrylic ester and maleic anhydride monomers into the polymerization reactor is carried out by pumping a solution of maleic anhydride in the (meth)acrylic ester under pressure, mixing this solution with the ethylene stream and homogenizing this mixture before it is fed into the polymerization reactor, the said homogenization being carried out in a venturitype homogenizer and then in a spiral homogenizer.

The applicant has found, in a surprising manner, that in such a process for the manufacture of ethylene terpolymers comprising moieties derived from a (meth)acrylic ester and moieties derived from maleic anhydride, the (meth) acrylic ester and maleic anhydride monomers could be introduced into the polymerization reactor by being fed at the intake of a secondary compressor without it then being necessary to pass the mixture of these monomers with ethylene through a homogenization device, which presents appreciable advantages.

SUMMARY OF THE INVENTION

A first aim of the present invention relates to a process for the manufacture of radical ethylene terpolymers comprising moieties derived from an alkyl (meth)acrylate and moieties derived from maleic anhydride by copolymerizing, in the presence of at least one free-radical initiator, a mixture of ethylene, an alkyl (meth)acrylate (the alkyl group having from 1 to 6 carbon atoms) and maleic anhydride in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein the feeding of the alkyl (meth)acrylate and maleic anhydride into the said polymerization reactor is effected by introducing a solution of maleic anhydride in the alkyl (meth)acrylate at the intake of the said secondary compressor.

A second aim of the present invention relates to a process making it possible to manufacture radical ethylene copolymers comprising moieties derived from a comonomer selected from an alkyl (meth)acrylate and maleic anhydride by copolymerizing, in the presence of at least one free-radical initiator, a mixture of ethylene and the said comonomer in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure between 1,000 and 2,500 bars and at a temperature between 140° and 280° C., wherein the feeding of the said comonomer into the said polymerization reactor is effected by introducing this comonomer at the intake of the said secondary compressor.

In an unexpected manner, despite the absence of homogenization of the monomers before they are fed into the reactor, the copolymerization takes place very well according to the present invention.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

PREFERRED EMBODIMENTS OF THE INVENTION

The present invention consequently provides a process for the manufacture of radical ethylene terpolymers comprising moieties derived from an alkyl (meth)acrylate and moieties derived from maleic anhydride by copolymerizing, in the presence of at least one free-radical initiator, a mixture of ethylene, an alkyl (meth)acrylate and maleic anhydride in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein the feeding of the alkyl (meth)acrylate and maleic anhydride into the said polymerization reactor is effected by introducing a solution of maleic anhydride in the alkyl (meth)acrylate at the intake of the said secondary compressor.

Terpolymers which can be manufactured according to the process of the present invention generally comprise:

50 to 99.2% by weight of moieties derived from ethylene.

0.5 to 40% by weight of moieties derived from an alkyl (meth)acrylate.

0.3 to 10% by weight of moieties derived from maleic anhydride.

Their melt index is generally between 0.1 and 500 dg/min.

The polymerization reactor which can be used according to the invention may be a tubular reactor or an autoclave reactor and may comprise one or more zones.

As mentioned above, the secondary compressor is connected directly to the polymerization reactor; its delivery pressure is consequently equal to that in the reactor, allowing for pressure drops.

The free-radical initiators which may be used according to the invention are initiators conventionally used in such a high-pressure polymerization process, such as for example 2-ethylhexyl peroxydicarbonate, ditert-butyl peroxide, tertiobutyl perbenzoate, tertiobutyl 2-ethylperhexanoate and isopropanoyl peroxide. Several initiators may be used simultaneously in the same reactor zone. As is well known to those skilled in the art, the choice of the initiator(s) is a function of the polymerization temperature.

A transfer agent may be introduced into the reaction mixture in a known manner to control the molecular weight of the polymer obtained. Such transfer agents are, for example, alkanes, such as propane and butane, olefins, in particular -olefins, aldehydes, ketones and the like.

According to an embodiment of the process of the invention for the manufacture of radical ethylene terpolymers comprising moieties derived from an alkyl (meth)acrylate and moieties derived from maleic anhydride, fresh ethylene is fed at the intake of a primary compressor the delivery pressure of which is between 200 and 300 bars, a solution of maleic anhydride in the alkyl (meth)acrylate is fed at the intake of the secondary compressor where it mixes with the fresh ethylene stream and the mixture of the three monomers is introduced, via the secondary compressor, into the reactor where the polymerization is carried out in the presence of at least one free-radical initiator at a temperature between 140° and 280° C. under a pressure between 1,000 and 2,500 bars.

The bottom of the reactor may be equipped with a pressure release valve enabling the pressure to be reduced to a level between 200 and 300 bars. The mixture of the molten terpolymer produced and the unreacted monomers passes through the said release valve and is conveyed to a medium pressure separator. The terpolymer is collected at the bottom of said separator while the unreacted monomers are recycled, after cooling and decanting of the low molecular weight (less than or equal to 5,000) polymers contained, to the intake of the secondary compressor. The bottom of the medium pressure separator can be equipped with a pressure release valve connected to a low-pressure hopper at the bottom of which the terpolymer is collected, the gas from the low-pressure hopper being recycled to the intake of the primary compressor.

The terpolymers manufactured according to the present invention have numerous uses, particularly in compositions for sealants, metal coating and hotmelt adhesives, as described in U.S. Pat. Nos. 4,404,299, 4,472,475 and 4,409,286.

The present invention also provides a process which makes it possible to manufacture radical ethylene copolymers comprising moieties derived from a comonomer selected from an alkyl (meth)acrylate and maleic anhydride by copolymerizing, in the presence of at least one free-radical initiator, a mixture of ethylene and comonomer in a device comprizing a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure between 1,000 and 2,500 bars and at a temperature between 140° and 280° C., wherein the feeding of the said comonomer into the said polymerization reactor is effected by introducing this comonomer at the intake of the said secondary compressor.

If necessary, the comonomer may be introduced according to the present invention at the intake of the secondary compressor, in solution in a solvent the properties of which are those indicated below:
good solvent power for the said comonomer
a negligible transfer constant with regard to ethylene
a boiling point between 100° and 250° C.

The free-radical initiators which can be used for the manufacture of the copolymers according to the invention are the same as those mentioned above.

The process of the present invention makes it possible to manufacture radical copolymers comprising 60 to 99.5% by weight of moieties derived from ethylene and 0.5 to 40% by weight of moieties derived from an alkyl (meth)acrylate, and radical copolymers comprising 90 to 99.7% by weight of moieties derived from ethylene and 0.3 to 10% by weight of moieties derived from maleic anhydride.

The following examples illustrate the invention in a non-restrictive manner.

EXAMPLE 1

Preparation of an ethylene/ethyl acrylate/maleic anhydride terpolymer

In the device described above, ethylene is injected at the intake of the primary compressor and a solution containing 300 g/l of maleic anhydride in ethyl acrylate is injected into the intake of the secondary compressor at 250 bars. The solution of maleic anhydride, with ethylene, then passes directly into a reactor where the polymerization is carried out under a pressure of 1900 bars at a temperature of 225° C. The conversion is 10%.

A terpolymer resin containing 3% by weight of moieties derived from maleic anhydride and 7% by weight of moieties derived from ethyl acrylate, and having a melt index of 7 dg/min, is obtained.

With a flow rate of 30 t/h of ethylene at the inlet of the reactor and 300 l/h of acrylic solution at the intake of the secondary compressor, 3000 kg/h of resin are produced.

EXAMPLE 2

Preparation of an ethylene/ethyl acrylate copolymer

In the device described above, ethylene is injected at the intake of the primary compressor and ethyl acrylate at the intake of the secondary compressor at 250 bars. The acrylate solution, with ethylene, then passes directly into the polymerization reactor operating under a pressure of 1600 bars at a temperature of 250° C.

A copolymer resin containing 20% by weight of ethyl acrylate, with a melt index of 1 dg/min, is obtained.

With a flow rate of 30 t/h of ethylene at the inlet of the reactor and 900 l/h of acrylate at the intake of the secondary compressor, 4.2 t/h of resin are obtained.

It will be apparent to those skilled in the art that various modifications and variations could be made in the process of the invention without departing from the scope or spirit of the invention.

What is claimed is:

1. A process for the manufacture of radical ethylene terpolymers comprising 50 to 99.2% by weight of moieties derived from ethylene, 0.5 to 40% by weight of moieties derived from an alkyl (meth)acrylate and 0.3 to 10% by weight of moieties derived from maleic anhydride by copolymerizing, in the presence of at least one free-radical initiator, a mixture of ethylene, an alkyl (meth)acrylate and maleic anhydride, in a device comprising a primary compressor, the delivery pressure of which is between 200 and 300 bars, connected to a secondary compressor which is connected directly to a polymerization reactor, fresh ethylene being fed at the intake of the said primary compressor and said copolymerization being carried out in the said polymerization reactor under a pressure of between 1,000 and 2,500 bars and at a temperature of between 140° and 280° C., wherein the feeding of the alkyl (meth)acrylate and maleic anhydride into the said polymerization reactor is effected by introducing a solution of maleic anhydride in the alkyl (meth)acrylate at the intake of the said secondary compressor.

2. A process for the manufacture of radical ethylene copolymers comprising moieties derived from a comonomer selected from an alkyl (meth)acrylate and maleic anhydride, by copolymerizing, in the presence of at least one free-radical initiator, a mixture of ethylene and comonomer in a device comprising a primary compressor, the delivery pressure of which is between 200 and 300 bars, connected to a secondary compressor, which is connected directly to a polymerization reactor, fresh ethylene being fed at the intake of the said primary compressor and said copolymerization being carried out in the said polymerization reactor under a pressure between 1,000 and 2,500 bars and a temperature between 140° and 280° C., wherein the feeding of the said comonomer into the said polymerization reactor is effected by introducing this comonomer at the intake of the said secondary compressor.

3. A process according to claim 2, wherein the comonomer is an alkyl (meth)acrylate, the content of which in the copolymer is between 0.5 and 40% by weight, the ethylene content being 60 to 99.5% by weight.

4. A process according to claim 2, wherein the said comonomer is maleic anhydride, the content of which in the copolymer is between 0.3 and 10% by weight, the content of ethylene being 90 to 99.7% by weight.

* * * * *